(12) United States Patent
Heck et al.

(10) Patent No.: US 8,605,280 B2
(45) Date of Patent: Dec. 10, 2013

(54) MULTIMETALLIC NANOSHELLS FOR MONITORING CHEMICAL REACTIONS

(75) Inventors: Kimberly Nadia Heck, Houston, TX (US); Nancy Jean Halas, Houston, TX (US); Michael Sha-Nang Wong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 162 days.

(21) Appl. No.: 12/741,586

(22) PCT Filed: Nov. 6, 2008

(86) PCT No.: PCT/US2008/082703
§ 371 (c)(1),
(2), (4) Date: May 5, 2010

(87) PCT Pub. No.: WO2009/061972
PCT Pub. Date: May 14, 2009

(65) Prior Publication Data
US 2011/0090497 A1    Apr. 21, 2011

Related U.S. Application Data

(60) Provisional application No. 60/985,904, filed on Nov. 6, 2007.

(51) Int. Cl.
*G01J 3/44* (2006.01)
(52) U.S. Cl.
USPC .......................................................... 356/301
(58) Field of Classification Search
USPC .............................................. 356/72–73, 301
See application file for complete search history.

(56) References Cited

U.S. PATENT DOCUMENTS

| | | | |
|---|---|---|---|
| 4,836,637 A | 6/1989 | Poorman et al. | |
| 6,861,263 B2 * | 3/2005 | Natan | 436/164 |
| 7,371,457 B2 | 5/2008 | Oldenburg et al. | |
| 7,623,234 B2 * | 11/2009 | Puzey | 356/326 |
| 2002/0160195 A1 | 10/2002 | Halas et al. | |
| 2002/0187347 A1 * | 12/2002 | Halas et al. | 428/403 |
| 2005/0255236 A1 | 11/2005 | Deng et al. | |
| 2008/0096289 A1 | 4/2008 | Zhou et al. | |
| 2008/0204742 A1 | 8/2008 | Halas et al. | |
| 2009/0213369 A1 * | 8/2009 | Lee et al. | 356/301 |

FOREIGN PATENT DOCUMENTS

WO  PCT/US2008/082703    5/2009

OTHER PUBLICATIONS

A. Tolia, Real-Time Measurements of Reaction Intermediates and Absorbed Species in Heterogenous Catalytic Reaction Systems Chem. Engineering Science 47, 2781 (Jun.-Aug. 1992).
H.Y.H. Chan, Methanol Oxidation on Palladium Compared to Rhodium at Ambient Pressures as Probed by Surface-Enhanced Raman . . . , Journal of Catalysis 174, 191 (Mar. 10, 1998).

(Continued)

*Primary Examiner* — Gregory J Toatley
*Assistant Examiner* — Abdullahi Nur
(74) *Attorney, Agent, or Firm* — Boulware & Valoir

(57) ABSTRACT

The invention relates to a multimetallic nanoshell sensor which comprises a core that is less conductive that a first metallic layer and having a catalytically active second metallic layer partially or completely surrounding the first metallic layer. The sensor can be used in any surface enhanced spectroscopic applications.

13 Claims, 12 Drawing Sheets

(a) Synthesis schematic for catalytic Pd/Au NSs; (b) SEM of Pd/Au NSs (scale bar: 500 nm); (c) and preparation schematic for NS SERS substrate.

(56) References Cited

OTHER PUBLICATIONS

C.T. Willams, Surface-Enhanced Raman Spectroscopy as an in Situ Real Time Probe of Catalytic Mechanisms at High Gas Pressures, Journal of Catalysis 163, 63 (Sep. 15, 1996).

T. Wilke, Surface-Enhanced Raman Spectroscopy at Transition Metal-GasInterfaces: Adsorption and Reactions of Sulfur Dioxide on . . . , Journal of Catalysis 130, 62 (Jul. 1991).

M. Mrozek, Periodic Trends in Electrode-Chemisorbate Bonding: Ethylene on Platinum-Group and Gold Electrodes . . . , Journal of Physical Chemistry B 105, 8931 (Sep. 20, 2001).

C.T. Williams, In Situ Real-Time Studies of Heterogeneous Catalytic Mechanisms at Ambient Pressures As Probed by . . . , Indus. & Engineered Chemistry Research 37, 2307 (Jun. 1998).

B.R.Z.Q. Tian, Surface-Enhanced Raman Scattering: From Noble to Transition Metals and from Rough Surfaces to . . . , Journal Physical Chemistry B 106, 9363 (Sep. 19, 2002).

R.B.Tian ZQ, Adsorption and Reaction at Electrochemical Interfaces as Probed by Surface-Enhanced Raman Spectroscopy, Annual Review of Physical Chemistry 55, 197 (2004).

X. Li, Electroreduction Activity of Hydrogen Peroxide on Pt and Au Electrodes, Langmuir 21, 9251 (Sep. 27, 2005).

G.L. Beltramo, Oxidation of Formic Acid and Carbon Monoxide on Gold Electrodes Studied by Surface-Enhanced Raman Spectroscopy and DFT, Chemphyschem 6, 2597 (Dec. 9, 2005).

J. Aizpurua, Optical properties of coupled metallic nanorods for field-enhanced spectroscopy Physical Review Letters 0 (Feb. 7, 2003).

D.P. Fromm, Exploring the chemical enhancement for surface-enhanced Raman scattering with Au bowtie nanoantennas, Journal of Chemical Physics 124 (Feb. 14, 2006).

S.J. Oldenburg, Nanoengineering of optical resonances, Chemical Physics Letters 288, 243 (May 22, 1998).

C. Fokas, Towards in Situ Raman Microscopy of Single Catalytic Sites, Applied Spectroscopy 56, 192 (Feb. 2002).

R. Gomez, Nanoparticles-on-electrode approach for in situ surface-enhanced Raman spectroscopy studies with platinum-group metals: examples and prospects, Journal of Raman Spectroscopy 36, 613 (Jun.-Jul. 2005).

M.S. Abdelsalam, SERS at Structured Palladium and Platinum Surfaces, Journal of the American Chemical Society (2007).

C. Burato, Functional Resins as Hydrophilic Supports for Nanoclustered Pd(0) and Pd(0)-Au(0) Catalysts Designed for the Direct Synthesis of Hydrogen Peroxide, Advanced Synthesis & Catalysis 348, 255 (Jan. 2006).

D.I. Enache, Solvent-Free Oxidation of Primary Alcohols to Aldehydes Using Au-Pd/TlO 2 Catalysts, Science 311, 362 (Jan. 20, 2006).

M. Bonarowska, Hydrodechlorination of CCl2F2 (CFC-12) over Pd-Au/C catalysts, Applied Catalysis B-Environmental 35, 13 (Dec. 2001).

M. Bonarowska, Hydrodechlorination of CCl2F2 (CFC-12) over silica-supported palladium-gold catalysts, Applied Catalysis B Environmental 30, 187 (Feb. 2001).

M. O. Nutt, Designing Pd-on-Au Bimetallic Nanoparticle Catalysts for Trichloroethene Hydrodechlorination, Environmental Science & Technology 39, 1346 (Mar. 1, 2005).

S. Lambert, Pd-Ag/SiO2 and Pd-Cu/SiO2 cogelled xerogel catalysts for selective hydrodechlorination of 1,2-dichloroethane into ethylene, Catalysis Today 100, 283 (Feb. 28, 2005).

M. O. Nutt, Improved Pd-on-Au bimetallic nanoparticle catalysts for aqueous-phase trichloroethene hydrodechlorination Applied Catalysis Benvironmenta 69, 115 (2006).

Hu, Synthesis of Au@pd Core-Shell Nanoparticles with Controllable Size and Their Application in Surface-Enhanced Raman Spectroscopy, Chemical Physics Letters 408, 4-6, (Jun. 17, 2005).

* cited by examiner

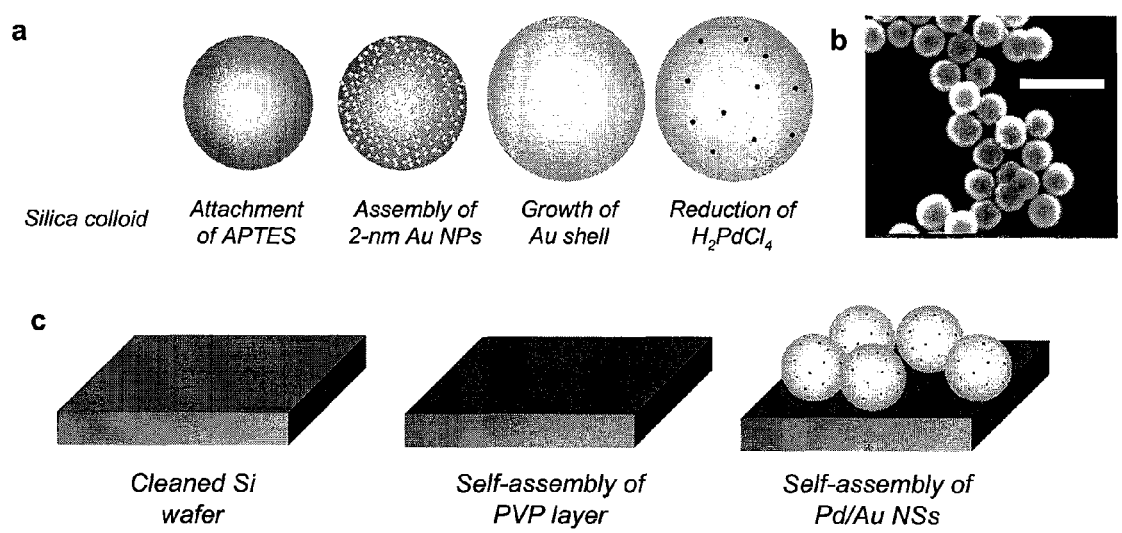
Figure 1. (a) Synthesis schematic for catalytic Pd/Au NSs; (b) SEM of Pd/Au NSs (scale bar: 500 nm); (c) and preparation schematic for NS SERS substrate.

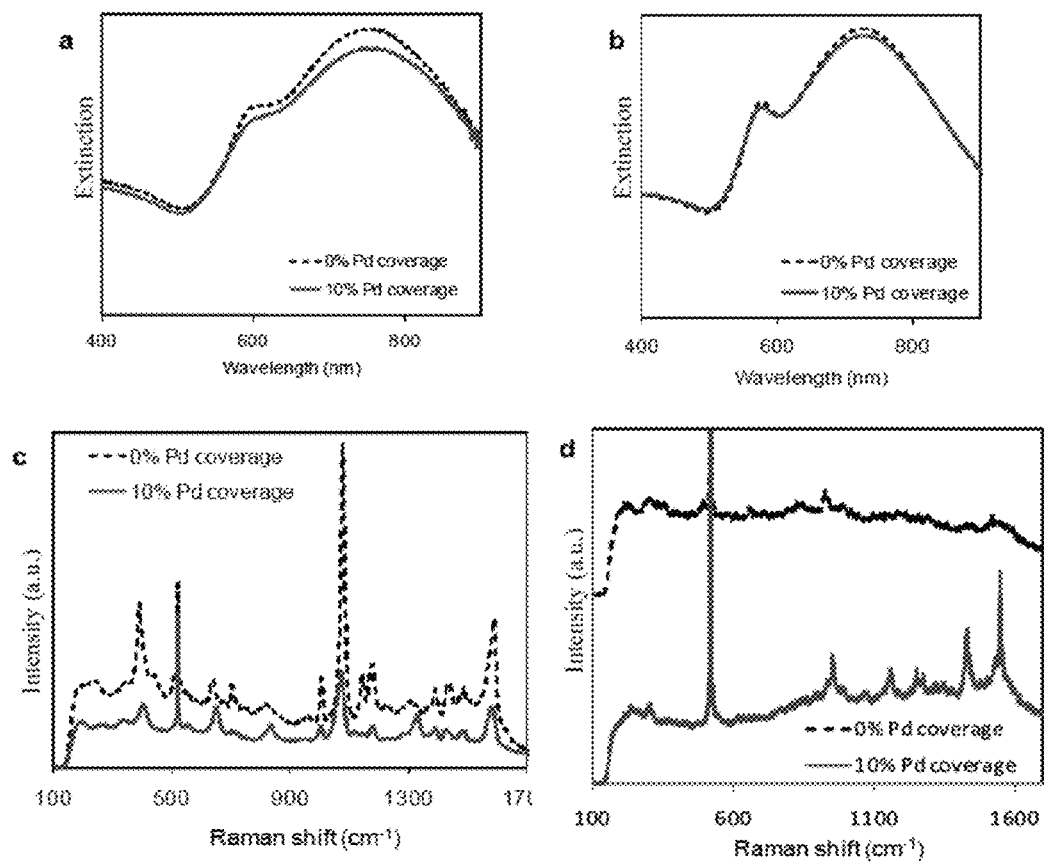

Figure 2 (a) UV-vis spectra of Au NS and Pd/Au NS (10% Pd coverage); (b) calculated spectra of Au and Pd/Au NS, (c) spectra of pMA chemisorbed on Au NS and Pd/Au NS (10% Pd coverage) (inset: metal-S stretching region); (d) 1,1-DCE in $H_2O$ (50.9 μM) on Au NS and Pd/Au NS (10% Pd coverage) (spectra offset for clarity). The Raman peak at ~500 $cm^{-1}$ comes from the Si wafer, and small peaks in the 900-1000 $cm^{-1}$ and 1400-1600 $cm^{-1}$ regions are from organic residuals prior to contact with 1,1-DCE.

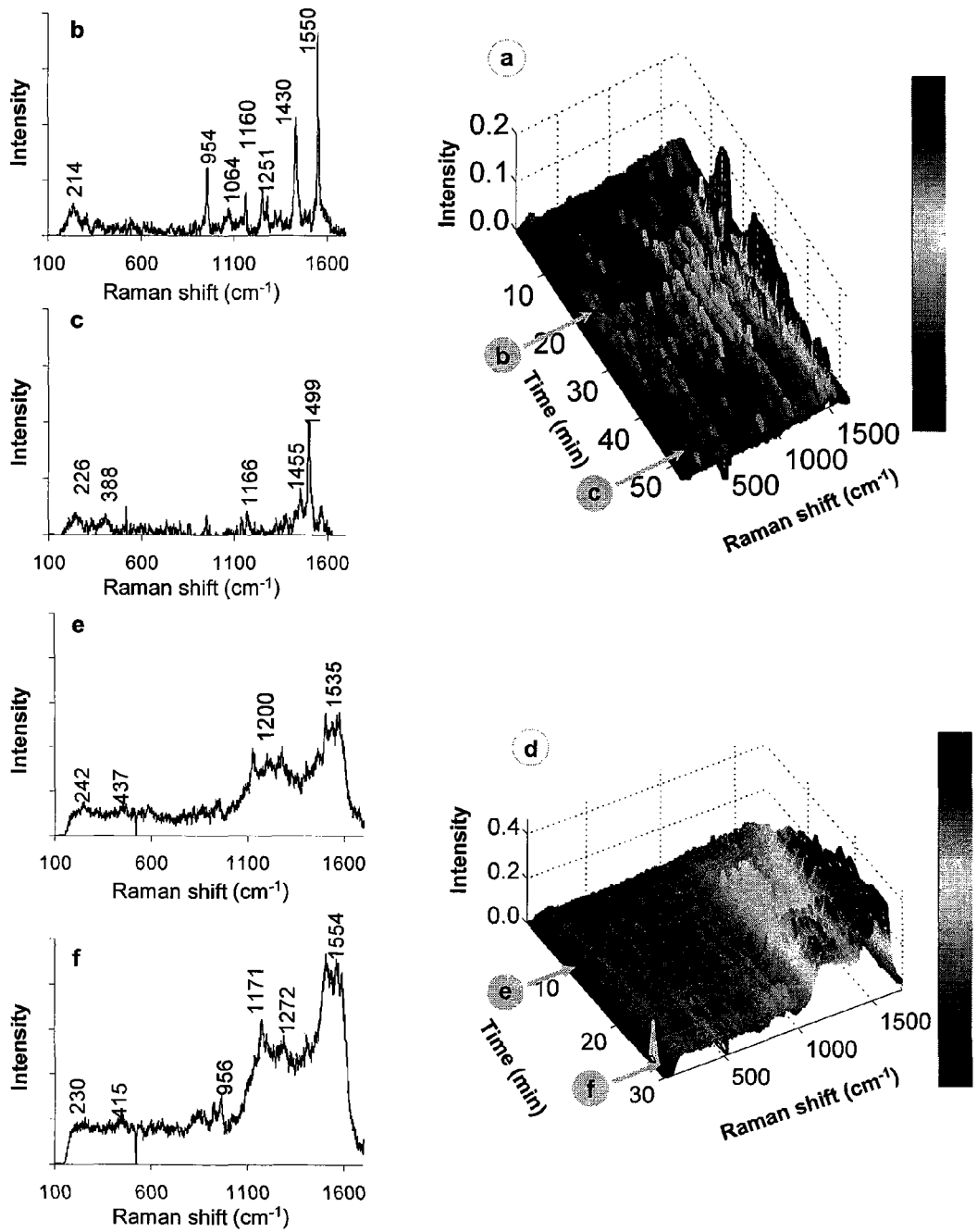
Figure 3. (a) Waterfall plot of time-resolved spectra gathered from the chemisorption of 50.9 μM 1,1-DCE on Pd/Au NSs and (b,c) individual scans at 20 and 49 minutes after injection of 1,1-DCE solution. (d) Waterfall plot of time-resolved spectra gathered from the chemisorption of 254 μM 1,1-DCE and (e,f) individual scans at 10 and 28 minutes after injection of 1,1-DCE solution.

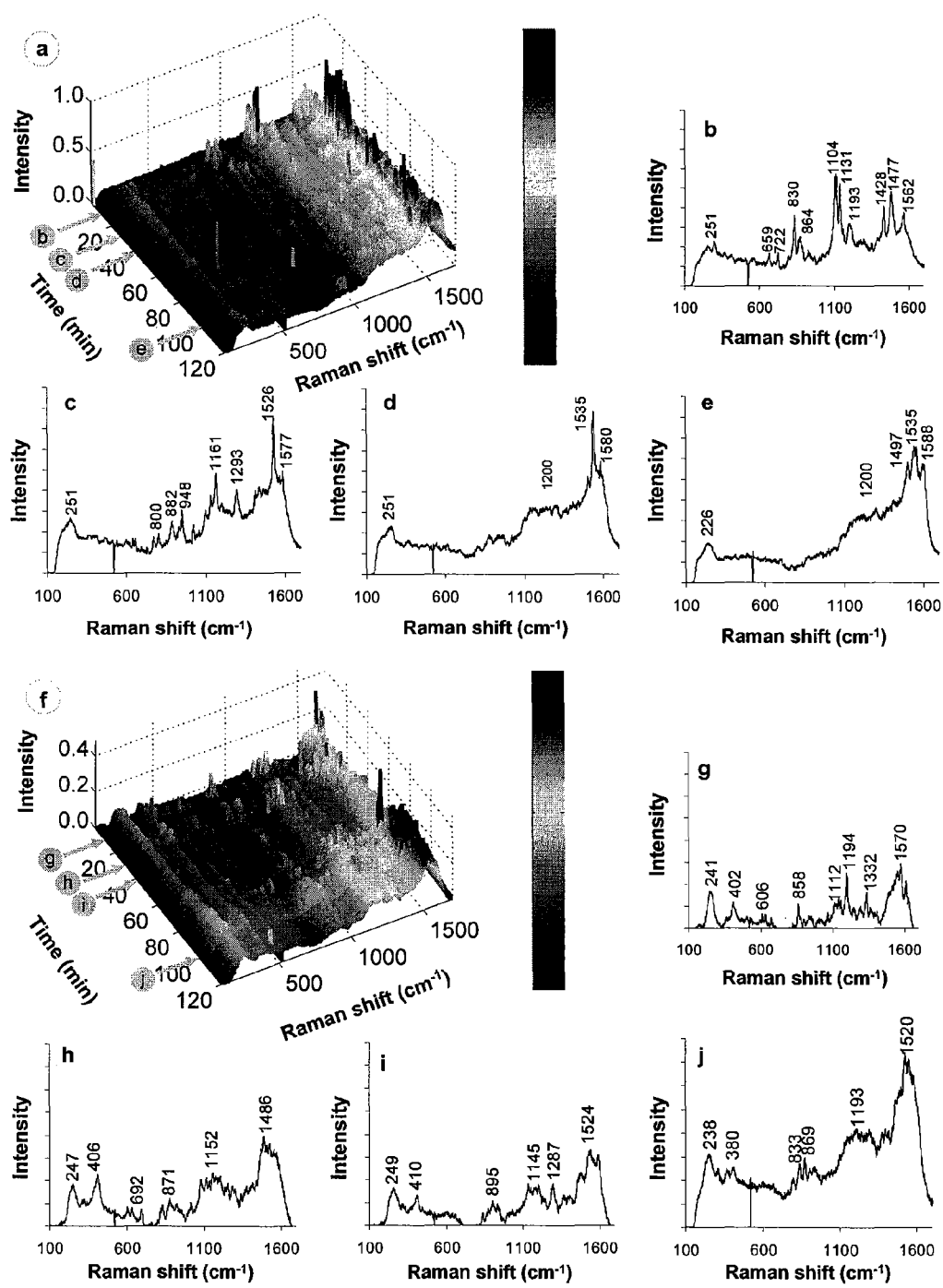

Figure 4. (a) Waterfall plot of time-resolved spectra gathered from the reaction of 50.9 µM 1,1-DCE and 16.3 mM $H_2$ on Pd/Au NSs, and individual scans at 12, 30, 41 and 100 minutes (b, c, d, and e respectively) after injection of 1,1-DCE/$H_2$ solution. (f) Waterfall plot of time-resolved spectra gathered from the reaction of 254 µM 1,1-DCE and 81.9 mM $H_2$ on Pd/Au NSs, and individual scans at 12, 30, 41 and 100 minutes (g, h, i, and j, respectively) after injection of 1,1-DCE/$H_2$ solution.

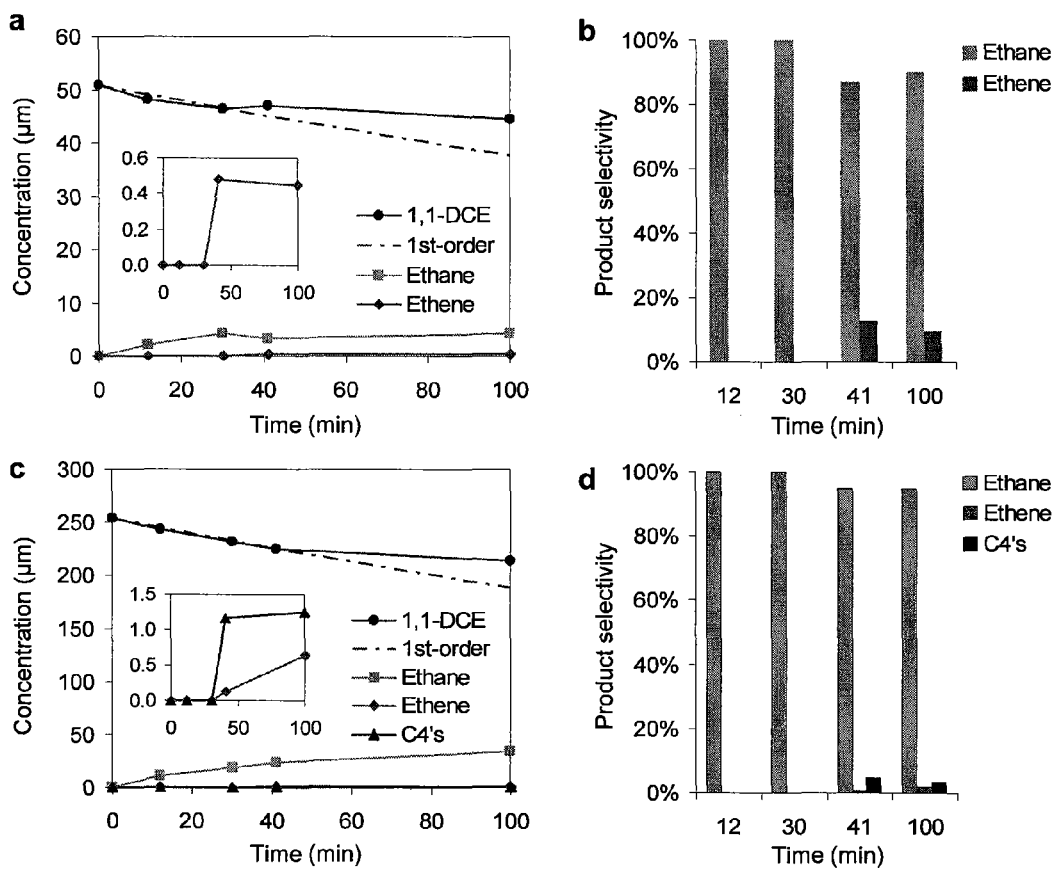
Figure 5. (a) Concentration-time profiles and (b) product selectivities from the HDC reaction of 50.9 μM 1,1-DCE and 16.3 mM $H_2$, and (c) concentration-time profiles and (d) product selectivities from the HDC reaction of 254 μM 1,1-DCE and 81.9 mM $H_2$ using Pd/Au NS SERS substrate. The dashed traces show the expected 1,1-DCE concentrations using 0.003 $min^{-1}$ as the first-order reaction rate constant.

Figure 6A

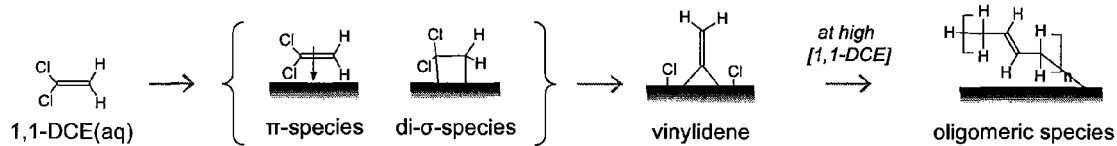

Scheme 1. Proposed surface intermediates of 1,1-DCE after adsorption on Pd/Au NS SERS substrate based on spectroscopic results. The arrows are drawn to indicate the probable sequence of identifiable species.

Figure 6B

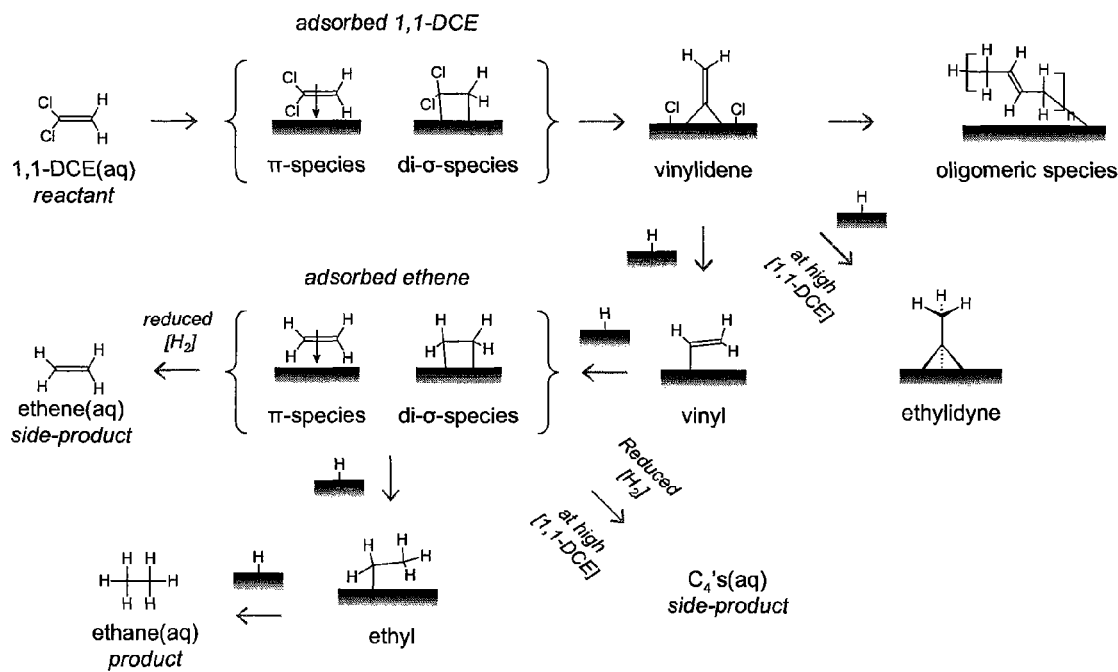

Scheme 2. Proposed surface intermediates of 1,1-DCE and $H_2$ under reactive conditions on Pd/Au NS SERS substrate based on spectroscopic results. The aqueous-phase 1,1-DCE, ethane, $C_4$'s, and ethane species were identified and quantified via gas chromatography. The arrows are drawn to indicate the probable sequence of identifiable species. The H surface atoms come from the dissociative adsorption of dissolved $H_2$.

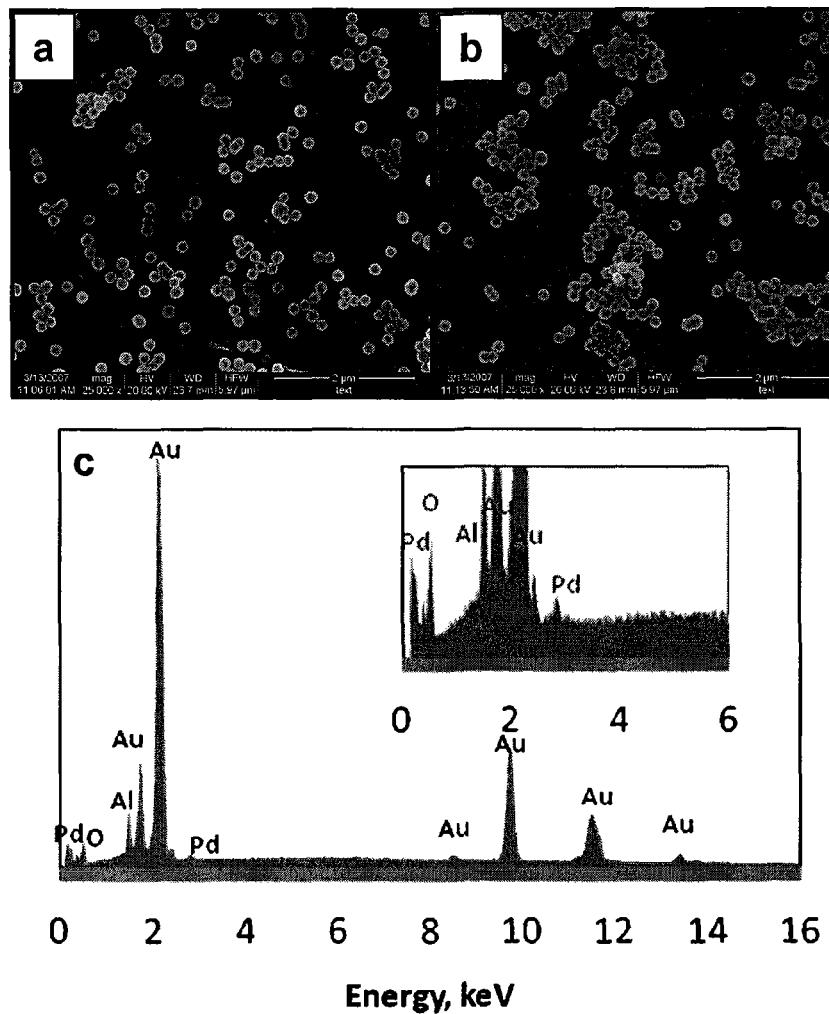
Figure 7. SEM images of (a) Au NSs and (b) Pd/Au NSs, and (c) EDS of Pd/Au NSs (Inset: Pd region).

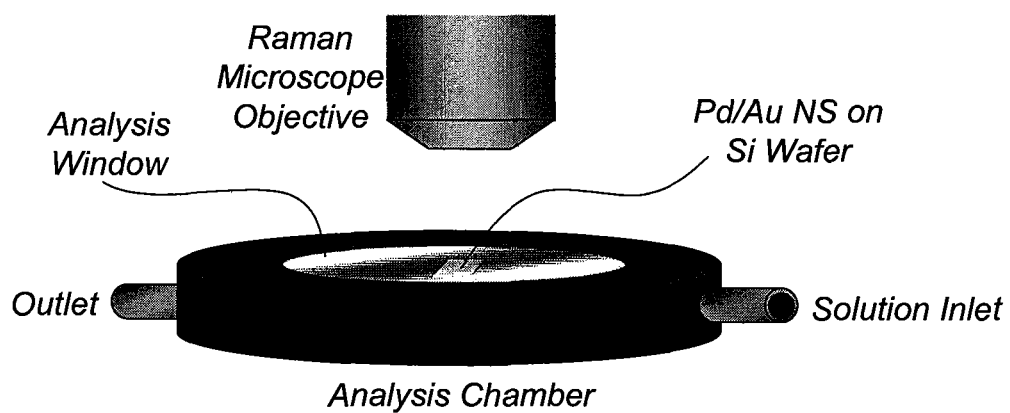
Figure 8. Schematic of flow chamber.

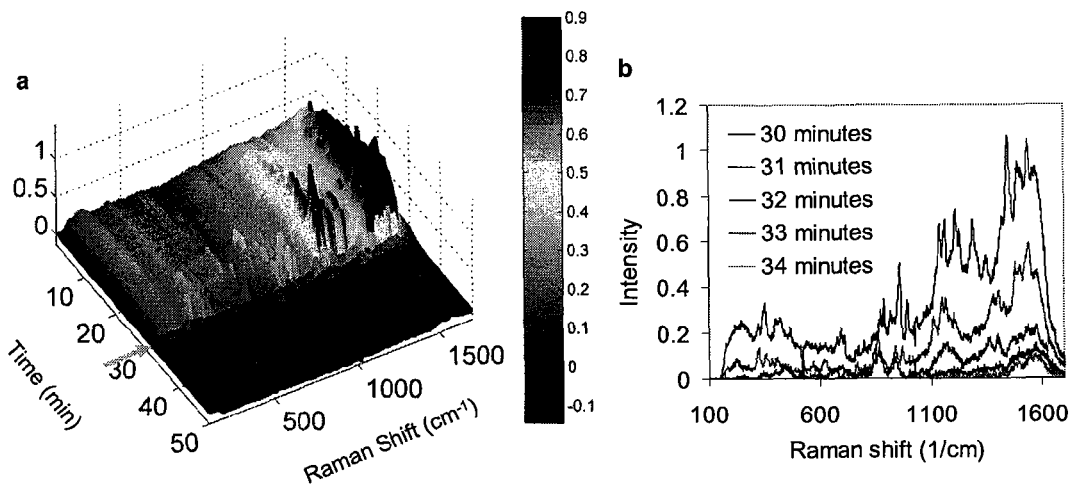
Figure 9. Waterfall plot of chemisorption of 254.4 µM 1,1-DCE followed by the addition of 81 mM $H_2$ in $H_2O$: (a) 1,1-DCE solution injected at t=0, $H_2$ in $H_2O$ added after 30 minutes, and (b) series of SERS spectra before and after addition of $H_2$ in $H_2O$.

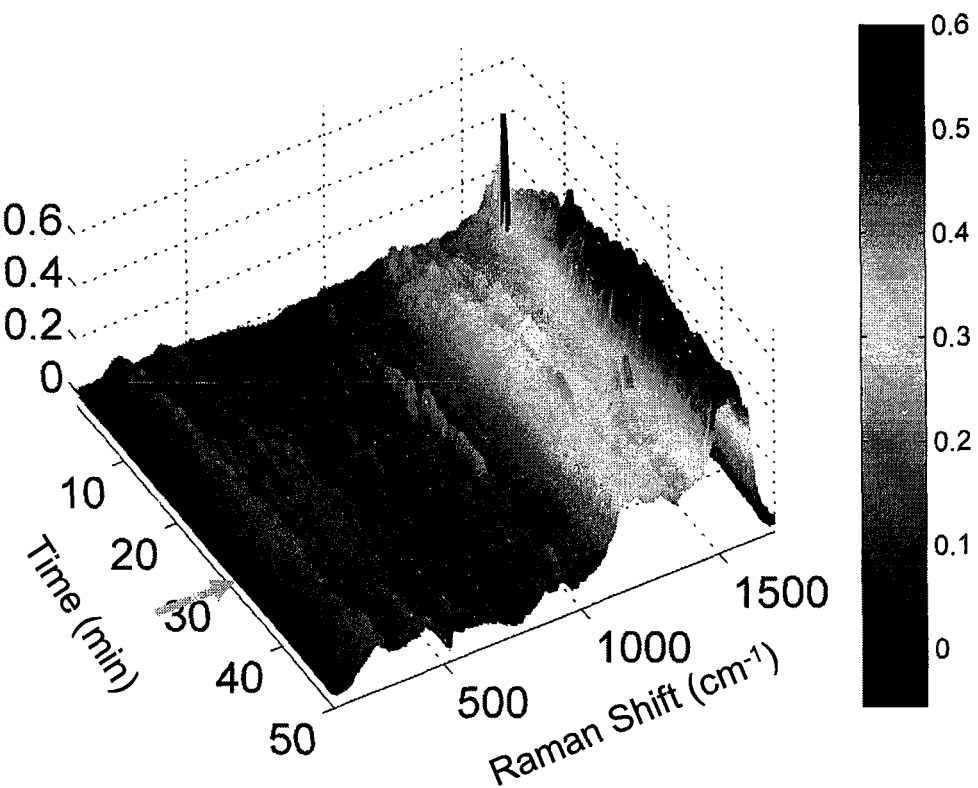
Figure 10. Waterfall plot of chemisorption of 254.4 μM 1,1-DCE followed by the addition of $N_2$ saturated water. 1,1-DCE solution injected at t=0, $N_2$ saturated water added after 30 minutes.

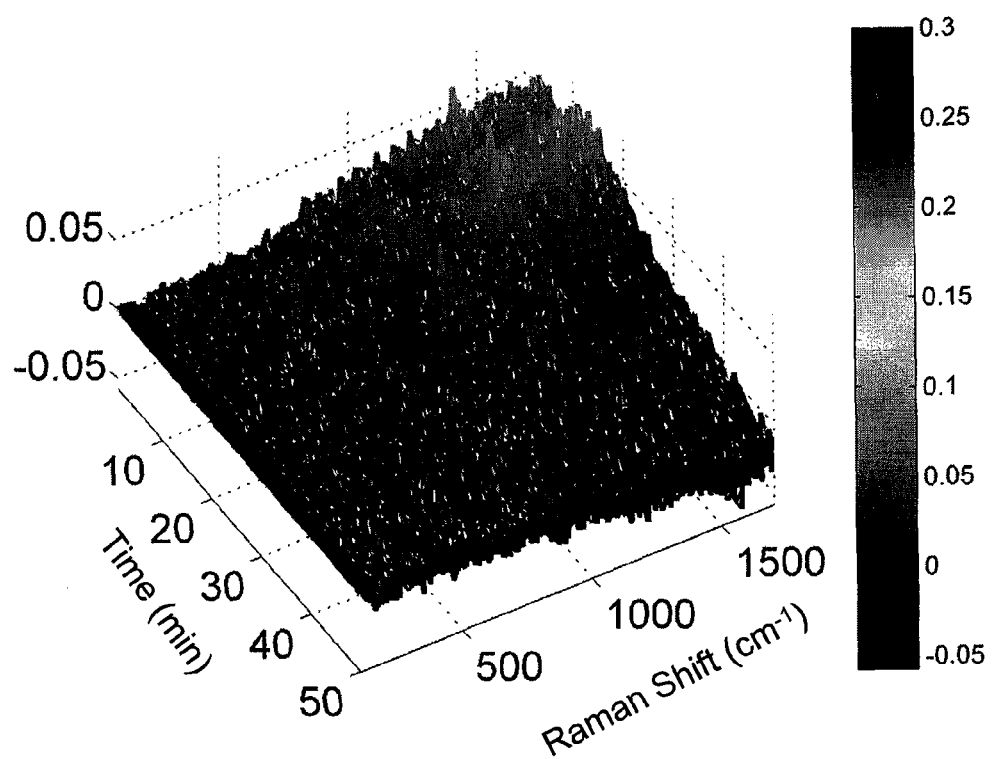
Figure 11. Waterfall plot of chemisorption of 254.4 μM 1,1-DCE over Au NSs.

US 8,605,280 B2

MULTIMETALLIC NANOSHELLS FOR MONITORING CHEMICAL REACTIONS

FEDERALLY SPONSORED RESEARCH STATEMENT

This invention was made with government support under Grant Numbers EEC-0118007 and DGE-0504425 awarded by the National Science Foundation. The government has certain rights in the invention.

CROSS-REFERENCE TO RELATED APPLICATIONS

This application is a 35 U.S.C. Section 371 of PCT/US2008/082703, filed Nov. 6, 2008 which application claims priority to U.S. Provisional Application No. 60/985,904, filed Nov. 6, 2007, both incorporated herein by reference.

FIELD OF THE INVENTION

The invention relates to sensors that comprise a multilayer nanoshell having a core material surrounded by a layer of coinage metal, such as gold, and then a layer or partial layer of platinum group metal, such as palladium. Sensors having this structure are considerably more sensitive in surface enhanced spectroscopy, thus improving the ability to monitor chemicals and chemical reactions.

BACKGROUND OF THE INVENTION

The platinum metals (ruthenium, rhodium, palladium, osmium, iridium, and platinum) have outstanding catalytic properties. The chemical industry, for example, uses a significant amount of either platinum or a platinum-rhodium alloy catalyst in the form of gauze to catalyze the partial oxidation of ammonia to yield nitric oxide, which is the raw material for fertilizers, explosives, and nitric acid. In recent years, a number of platinum-group metals have become important as catalysts in synthetic organic chemistry. Ruthenium dioxide is used as coatings on dimensionally stable titanium anodes used in the production of chlorine and sodium hydroxide. Platinum supported catalysts are used in the refining of crude oil, reforming, and other processes used in the production of high-octane gasoline and aromatic compounds for the petrochemical industry. Since 1979, the automotive industry has emerged as the principal consumer of platinum-group metals. Palladium, platinum, and rhodium have been used as oxidation catalyst in catalytic converters to treat automobile exhaust emissions. A wide range of platinum-group metal alloy compositions are used in low-voltage and low-energy contacts, thick- and thin-film circuits, thermocouples and furnace components, and electrodes.

Characterization of the binding and/or reaction of adsorbates at the surfaces of platinum group metals is critical for understanding and thus improving their catalytic reactions. However, current methods of studying these reactions are less than satisfactory. Electron energy loss spectroscopy (EELS), for example, is highly satisfactory in detecting molecules bound to model surfaces, but suffers from the need for expensive equipment and ultra-high vacuum environments. Hence, it cannot be used to replicate actual behavior of catalytic reactions that occur at or above atmospheric pressure or in the presence of a liquid. Fourier-transform infrared spectroscopy (FTIR), often coupled with the use of attenuated total reflectance (ATR) techniques and Raman spectroscopy, have also been used to characterize adsorption processes, but the technique is not surface selective and signal-to-noise ratios often suffer from solvent effects. Moreover, with the growing trend toward greener aqueous-based reactions, the technique is especially limited by the strong IR absorption of the O-H stretching modes of water. Additionally, current techniques often require integration times much longer than actual reaction times.

Thus, there is a critical unmet need for sensitive, surface-selective, and easy-to-implement methods to provide detailed molecular-level information on heterogeneous catalytic reactions while they occur under realistic reaction conditions.

Discovered in the late 1970's, surface-enhanced Raman spectroscopy (SERS) is a strong candidate to fulfill this need. Raman spectroscopy detects molecules with chemical bonds that exhibit changes in polarizability, and SERS provides orders-of-magnitude improvement in detection limit through the use of nanostructured metal substrates. The primary mechanism responsible for the surface enhancement is the ability of the metal to support directly excitable surface plasmons at the excitation laser wavelength and across the Stokes frequency range. This plasmon response provides an intense electromagnetic field at the metal surface at both the excitation and Stokes wavelengths.

The shape and size of the metal nanoparticles strongly affects the strength of the enhancement because these factors influence the ratio of absorption and scattering events. There is an ideal size for these particles—not just any small particles will have the same impact on the Raman intensity—as well as an ideal surface thickness for each experiment. Particles which are too large allow the excitation of multipoles, which are nonradiative. As only the dipole transition leads to Raman scattering, the higher-order transitions will cause a decrease in the overall efficiency of the enhancement. Particles which are too small, however, lose their electrical conductance and cannot enhance the field. Furthermore, when the particle size approaches a few atoms, the definition of a plasmon does not hold, as there must be a large collection of electrons to oscillate together.

With recent developments in understanding structure effects on plasmonic behavior in metal nanostructure synthesis, SERS substrates with higher and more highly reproducible enhancements can be designed. Engineered substrates based on nanometer-sized metallic shapes, like rods, rings, gaps, bowties, and shells offer SERS enhancements of up to $10^9$. In particular, Au nanoshell (NS) SERS substrates have been successfully used to determine conformation of surface-bound biomolecules and to transduce the spectral signature of surface-bound thiols in a high-resolution alloptical pH nanosensing device. The large active area for SERS on nanoshell surfaces, along with the large and highly reproducible enhancements designed into these structures, provide a SERS-active substrate that is quite promising for monitoring catalytic processes. However, existing Au nanoshells (e.g., US2008204742 by Halas; US2008096289 and US2008096289 by Zhou; and U.S. Pat. No. 7,371,457 et seq by Oldenburg) have only demonstrated enhancements up to $10^7$, so there is still room for improvement.

The use of SERS as a probe for adsorption and reaction of chemicals at catalytic surfaces has been attempted previously, with many groups attempting to overcome the inherent SERS limitation to coinage metals (gold and silver) and extend SERS to typical catalytic materials, such as palladium (Pd), rhodium (Rh), platinum (Pt) and iridium (Ir). Previous studies focused primarily on the study of electrochemical reactions, where the substrates typically were roughened Au electrodes coated with 1-2 nm of catalytic metal or covered with platinum-group metal nanoparticles. More recently, structured substrates consisting of solely of the catalytic material have been introduced. Overall, the techniques have enjoyed only moderate success, offering typical enhancements of $10^4$-$10^6$.

What is needed in the art are ever more sensitive detection methods, devices and compositions for use in biological, spectroscopic and other applications. More sensitive methods can be advantageously employed in the monitoring of chemical processes, for example in-line monitoring of water remediation processes.

BRIEF SUMMARY OF THE INVENTION

Gold nanoshells are a new class of materials that are being studied for uses in medical diagnostics, medical phototherapy, and sensing applications. With tunable optical (plasmonic) and electronic properties, gold nanoshells have been shown to improve the performance of a spectroscopic technique called surface-enhanced Raman spectroscopy (SERS), e.g., lower concentrations of molecules can be detected. However, the prior art gold nanoshells only show enhancements of about $10^6$ or $10^7$, and there is a need for even greater sensitivity.

This invention provides that needed sensitivity. In this invention, the prior art gold nanoshell is greatly improved by depositing a second catalytic metal on the gold nanoshell, such that the second metal in theory provides the function of chemical bonding for molecules to be detected and the function of surface reaction of the surface-bound molecule. The resulting nanoshell sensor can provide enhanced detection of $10^8$ fold. Thus the new nanoshell sensors can be used in surface enhanced spectroscopy to detect extremely small levels of chemical, on the order of parts per million to parts per billion and allows a wide range of chemical detection or monitoring applications.

The invention can be used in any surface enhanced spectroscopic method, including surface enhanced Raman spectroscopy (SERS), surface enhanced Raman scattering, surface-enhanced vibrational spectroscopy (SEVS), and surface enhanced infrared absorption spectroscopy (SEIRAS), molecule enhanced surface enhanced infrared spectroscopy (MOSEIRA), surface enhanced hyper-Raman spectroscopy (SEHRS), surface-enhanced Raman excitation spectroscopy (SERES), and the like.

FIG. 12 displays an embodiment of a multimetallic nanoshell 10 in the present invention. By "multimetallic nanoshell" what is meant is a nanosized (≥50 nm) shell structure having a core 11 and at least 2 different metallic layers. The first metallic layer 12 is a metal that can conduct electricity better than the core and the second metallic layer 13 is a different metal.

"Core" is defined herein to be the innermost layer or center of the multimetallic nanoshell. The core can be made of any material that is less conducting than the first metallic layer. Specifically contemplated are non-conducting layers made of dielectric materials and semiconductors, such as monodispersed colloidal silica, silicon dioxide, titanium dioxide, polymethyl methacrylate (PMMA), polystyrene, gold sulfide and macromolecules such as dendrimers. Further, the cores can be removed when the multimetallic shells are completed, either by calcination or by dissolving them in a proper solvent. This gives rise to hollow nanoshells, sometimes also known as quantum bubbles. The core may be spherical in shape, but many shapes are possible, such as cubes, cups, tubes, prisms, ellipsoidal, hemispherical, tetrahedrons, or prisms, and the like. Regardless of the geometry of the core, the core particles are preferably homogenous in size and shape, although mixtures of shapes may have particular applications where a range of optical wavelengths are to be employed. Core sizes can range from 50-1000 nm, and preferably are about 75-150 nm or about 100-135 nm in size.

In preferred embodiments, the multimetallic nanoshells are assembled into an film geometry, where far more efficient light collection is achievable and loss due to reabsorption of the Raman emission is minimized.

"First metallic layer" or "middle metallic layer" is defined herein to be the metallic layer immediately adjacent to and surrounding the core. The first metallic layer is a metal that can conduct electricity better than the core material. Suitable materials include noble or coinage metals, such as gold, silver, copper or the like, and combinations thereof. Alloys or non-homogenous mixtures of such metals may also be used. The first metallic layer may have a thickness that ranges from approximately 1 to 50 nm, and preferably from <20 nm or <1 nm. The first metallic layer coats the adjacent inner core fully and uniformly or may only partially coat that layer. Preferably, 100% of the adjacent inner core is coated by the conducting layer. For simplicity, the disclosure focuses on the use of cores that are spherical or elliptical. However, other shapes are possible, for example rods, stars, pyramids, cubes, eggs and cups, and the like.

By varying the relative the dimensions of the core and the first metallic layer, the optical resonance of these nanoshells can be precisely and systematically varied over a broad region ranging from the near-UV to the mid-infrared. The thickness of the core and first metallic layer are varied to generate a particular plasmon resonance frequency as described in U.S. Pat. No. 6,344,272, U.S. Pat. No. 6,699,724, or U.S. Pat. No. 7,147,687, each incorporated by reference in its entirety.

The "second metallic layer" or "outer metallic layer" refers herein to a second metallic layer outside the first metallic layer. The second layer (or partial layer) can be any platinum group metal, including ruthenium, rhodium, palladium, osmium, iridium, or platinum. In a preferred embodiment, the second layer is only a partial layer, creating "islands" of metal to which chemicals can bind for detection. In preferred embodiments, the second layer is present at 5-50% covered, and in a preferred embodiment 7-15% or 10% coverage is achieved. In preferred embodiments, the second layer is submicron in size (for islands) and/or thickness. 100% coverage may be preferred if the SERS enhancement remains high. This second metallic layer is preferred to be catalytically active to force target molecules (to be sensed) to undergo chemical transformations.

"Platinum group metal" means ruthenium, rhodium, palladium, osmium, iridium, or platinum. "Coinage metal" means gold, silver, and copper.

The three layers of the multimetallic nanoshell can be doped, passivated, derivatized or otherwise modified as needed for particular applications. In particular, attachment of a metallic shell around an inner core may employ a linker for adding the first metallic layer, such as aminopropyltriethoxy silane (APTES), aminopropyl trimethoxy silane, diaminopropyl diethoxy silane, or 4-aminobutyl dimethylmethoxysilane, and the like, as described in U.S. Pat. No. 7,371,457, incorporated by reference herein.

The increased sensitivity of the multimetallic nanoshell makes several applications practical. For example, very low concentrations of chemicals or chemical reactions can now be detected with portable spectrometers in the field or plant using portable spectrometers. Thus, inline monitoring of chemicals or reactions in plant pipelines is now possible. Any chemical that binds to or reacts with the second metal can thus be monitored with the sensors of the invention. In particular, the reactions exemplified herein demonstrate that the gold-palladium nanoshell can be used to monitor water or effluent purity, in particular from 1,1-DCE and other chlorinated pollutants.

Other uses that might be realized in the future include using light to initiate and drive and surface reactions. This would be very different from conventional photocatalysis, in which a semiconductor material is activated for chemical reactions using light, as the light in this case would cause local heating and increasing the temperature-dependent reaction rates.

BRIEF DESCRIPTION OF THE DRAWINGS

FIG. 1A is the synthesis scheme for the preparation of Au/Pd nanoshells. FIG. 1B is the scheme for preparation of the substrate. FIG. 1C is a scanning electron micrograph of the resulting nanoshells.

FIG. 2A is the UV-vis spectra of Au NS and Pd/Au NS (10% Pd coverage). FIG. 2B is the calculated spectra of Au and Pd/Au nanoshells. FIG. 2C is the spectra of pMA chemisorbed on Au NS and Pd/Au NS (10% Pd coverage) (inset: metal-S stretching region). FIG. 2D is 1,1-DCE in H2O (50.9 µM) on Au NS and Pd/Au NS (10% Pd coverage) (spectra offset for clarity).

FIG. 3A is a Waterfall plot of time-resolved spectra gathered from the chemisorption of 50.9 µM 1,1-DCE on Pd/Au nanoshells. FIGS. 3B and C are individual scans at 20 and 49 minutes after injection of 1,1-DCE solution. FIG. 3D is a Waterfall plot of time-resolved spectra gathered from the chemisorption of 254 µM 1,1-DCE. FIGS. 3E and F are individual scans at 10 and 28 minutes after injection of 1,1-DCE solution.

FIG. 4A is a Waterfall plot of time-resolved spectra gathered from the reaction of 50.9 µM 1,1-DCE and 16.3 mM H2 on Pd/Au NSs, and individual scans at 12, 30, 41 and 100 minutes (FIGS. 4B, C, D and E respectively) after injection of 1,1-DCE/H2 solution. FIG. 4F is a Waterfall plot of time-resolved spectra gathered from the reaction of 254 µM 1,1-DCE and 81.9 mM H2 on Pd/Au NSs, and individual scans at 12, 30, 41 and 100 minutes (FIGS. 4G, H, I and J, respectively) after injection of 1,1-DCE/H2 solution.

FIG. 5A Concentration-time profiles, FIG. 5B product selectivities from the HDC reaction of 50.9 µM 1,1-DCE and 16.3 mM H2. FIG. 5C concentration-time profiles and FIG. 5D product selectivities from the HDC reaction of 254 µM 1,1-DCE and 81.9 mM H2 using Pd/Au NS SERS substrate.

FIG. 6A Proposed surface intermediates of 1,1-DCE after adsorption on Pd/Au NS SERS substrate based on spectroscopic results. FIG. 6B Proposed surface intermediates of 1,1-DCE and $H_2$ under reactive conditions on Pd/Au NS SERS substrate based on spectroscopic results.

FIG. 7 SEM images of (a) Au NSs and (b) Pd/Au NSs, and (c) EDS of Pd/Au NSs (Inset: Pd region).

FIG. 8 Schematic of flow chamber.

FIG. 9 Waterfall plot of chemisorption of 254.4 µM 1,1-DCE followed by the addition of 81 mM $H_2$ in $H_2O$: (a) 1,1-DCE solution injected at t=0, $H_2$ in $H_2O$ added after 30 minutes, and (b) series of SERS spectra before and after addition of $H_2$ in $H_2O$.

FIG. 10 Waterfall plot of chemisorption of 254.4 µM 1,1-DCE followed by the addition of $N_2$ saturated water. 1,1-DCE solution injected at t=0, $N_2$ saturated water added after 30 minutes.

FIG. 11 Waterfall plot of chemisorption of 254.4 µM 1,1-DCE over Au NSs.

DETAILED DESCRIPTION OF THE INVENTION

Figure 12:
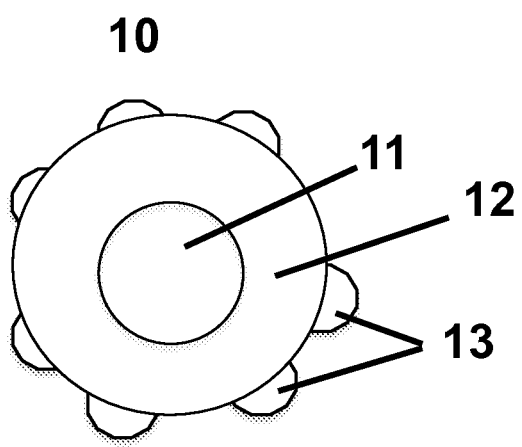
FIG. 12 is a cross-sectional view of a particle according to an embodiment of the present invention.

As a demonstration of the invention, palladium (Pd) was deposited onto gold (Au) nanoshells, to form Pd-on-Au nanoshells (Pd/Au NS's). These nanoshells were assembled onto a flat film, and the nanoshell ensemble was used to study the catalysis of trichloroethene hydrodechlorination (TCE HDC), an important chemical reaction for groundwater treatment, as an exemplary system to demonstrate the increased sensitivity contributed by the second metallic layer. It was found that Pd/Au nanoshells were much more sensitive to low concentrations of dichloroethene (related to TCE) than plain Au nanoshells were. The advantages of multimetallic nanoshell-SERS over other techniques are that water does not interfere with the spectroscopy and that the chain of surface reactions can be observed while it is happening.

The Pd/Au nanoshells described herein have reactive Pd "islands" on the shell surface, that increase the sensitivity of regular, uncoated nanoshells for certain chlorinated chemical compounds. Pd/Au nanoshells are demonstrated herein to be much more sensitive than plain Au nanoshells in detecting these chlorinated compounds. Other coating metals can be chosen that are reactive for other compounds. Further, the surface-bound compounds can be induced to react with other compounds, and this surface reaction (or surface reactions) can also be observed.

Example 1

Preparation of Nanoshells

The multi-step preparation is detailed as follows (FIG. 1a). Au nanoshells (NSs) were prepared as described previously. Briefly, 1 mL of 120-nm diameter silica colloid (Precision colloid P120) was added to 26 mM aminopropyltrimethoxysilane in ethanol, and aged overnight. The solution (500 µL) was then added to 40 mL of a sol of 1-2 nm Au NPs, previously prepared via the Duff method and aged for at least 2 weeks. The sample was aged overnight to allow the electrostatic self-assembly of the negatively charged Au NPs to the positively charged amine groups on the modified silica colloid. The sample was then centrifuged and redispersed in deionized water three times to ensure the removal of excess Au NPs, leaving a final volume of ~1 mL. The sample (15 µL) was added to 3 mL an aqueous solution of 370 µM $HAuCl_4$ and 18 mM $K_2CO_3$ and stirred. The gold salt was then reduced onto the silica cores by adding 30 µL of 30 wt % formaldehyde and shaking vigorously for 5 minutes. The sample was then centrifuged and redispersed in deionized water to ensure the removal of excess gold salt. Final volume of the solution was 3 mL.

The UV-visible spectrum of the Au NSs was fit using Mie scattering theory to determine the size and concentration of particles. Quantitative agreement between experimental and theoretical NS spectra was obtained for 60-nm radius $SiO_2$ core and 22-nm Au shell thickness (FIG. 2a,b), with the overall radius of 82 nm confirmed by analyzing 200 particles with SEM (Figure S1). The concentration of NSs was determined to be $1.18 \times 10_8$ particles/mL.

Au NSs coated with a sub-monolayer of Pd metal (Pd/Au NSs) were synthesized analogously to the previously reported synthesis of Pd/Au NPs. $H_2PdCl_4$ (7.2 µl, of 2.4 mM solution) was added to 18 mL of the as-synthesized Au NSs and stirred. The Pd salt was reduced by bubbling the solution with UHP $H_2$ gas for 5 minutes.

Scanning electron microscope (SEM) images and electron dispersive x-ray (EDX) spectra of the Pd/Au NSs were obtained using a FEI Quanta 400. For particle size analysis, 30 µL of either Au NSs or Pd/Au NSs was drop-dried onto an SEM stub. For EDX analysis, Pd/Au NSs were repeatedly dropdried onto a stub until a visibly thick layer was formed. The spectrum was obtained using a EDX detector attached to the SEM.

In order to characterize any changes in plasmonic behavior upon the addition of Pd, UV-vis absorbance spectra of the NSs were collected on a Shimadzu UV-2401 PC spectrophotometer using a polystyrene cuvette with a 1-cm path length.

The average Pd/Au NS diameter was found to be 164 nm, according to SEM analysis (FIG. 1c), indicating no detectable size increase after the addition of Pd metal. Electron dispersive x-ray (EDX) spectroscopy confirmed the presence of Pd (Fig. S1). We estimated that the Au NS surfaces had a ~10% coverage of Pd atoms (meaning ~10% of complete Pd monolayer coverage). The final composition of the Pd-decorated Au NSs was estimated at 6.7 wt % $SiO_2$, 90.6 wt % Au, and 2.7 wt % Pd. The plasmon resonance spectrum of the Au NSs decreased in intensity and red-shifted slightly with the addition of the Pd metal, similar to what had been observed with Pd-coated Au nanoparticles of much smaller size. The relatively large imaginary part of the Pd dielectric constant in the visible light regime damps the plasmon resonance, as seen in the Mie theoretical modeling of Au nanoshells with 100% Pd coverage (FIG. 2b).

Example 2

SERS

To immobilize the NSs, 5-mm×5-mm×0.5-mm polished Si wafers were cleaned in 3:7 solution of 30 wt % $H_2O_2$ and 30 wt % $H_2SO_4$ for 1 h. The wafers were then rinsed in deionized water and dried, before adding to a solution of 0.1 wt % poly(vinylpyridine) (MW ~40,000) in ethanol. After aging overnight, the wafers were rinsed in ethanol and dried. 50 µL of a concentrated solution of the NSs (volume reduced from 18 mL to 128 µL by centrifugation and removal of supernatant) was then pipetted onto a wafer and allowed to assemble overnight, schematically shown in FIG. 1b. After rinsing with deionized water to remove unattached NSs, the wafer was adhered to the center of an 18 mm round microscope coverslip using slide adhesive. Samples used in the reaction and chemisorption experiments were then plasma-cleaned under vacuum (Harrick Plasma Cleaner/Sterilizer, PDC-32G) to remove surface impurities for 2 min just prior to Raman analysis.

To determine the SERS effectiveness of Pd/Au NSs relative to the Au NSs, 10 µL of 440 µM paramercaptoaniline (pMA) in ethanol was added to samples prepared as in the previous section. pMA is a highly Raman active species, and has been used in a number of experiments to determine SERS efficiency. The samples were aged overnight to ensure the formation of a complete monolayer on the nanoshell surfaces in parafilm-sealed Petri dishes, and then rinsed with ethanol prior to analysis.

SERS spectra were obtained using a Renishaw in Via micro-Raman spectrometer with a 785-nm excitation laser and a 40× working distance objective. Spectra were obtained using 0.05 mW power and 10 second integration times. For each sample, eight spectra were acquired at different spots and averaged. Standard deviation between spectra for each sample was less than 5%.

To perform the adsorption (or chemisorption) and reaction experiments, the plasma-cleaned sample was mounted in a sealed analysis chamber with inlet and outlet ports (Warner Instruments RC-43, 213 µL volume without Pd/Au NS sample), and mounted inside the Raman spectrometer (Figure S2). Prior to the acquisition of spectra from the substrate, the reduction of Pd was ensured by flowing 10 mL of $H_2$ saturated deionized $H_2O$ and allowing to sit for 10 minutes.

We chose to study 1,1-DCE (1,1-dichloroethene), a less chlorinated form of TCE that lends itself to simpler spectral interpretations and that is hypothesized to be a reaction intermediate for TCE HDC. Solvents used to perform the chemisorption and reaction experiments were prepared by adding 180 mL of deionized water each to Boston Round screw top bottles (Alltech, 250 mL). The threads were wrapped with Teflon tape and sealed with a teflon-rubber septum. Two bottles (one used for catalyst rereduction and the other, for rinsing) were bubbled with UHP $H_2$ and $N_2$, respectively, for 1 hr.

Additional bottles were bubbled for 1 hr with $N_2$ or with $H_2:N_2$ gas mixtures (volume ratios of 20:80 and 100:0) for use in the chemisorption and/or reaction experiments. The $H_2$ concentrations present in the aqueous phase were estimated to be 16.3 and 81.9 mM, respectively, using a Henry's law constant of 1228 atm/M. After the bubbling step, 1 or 5 µL of 1,1-DCE was added, such that the $H_2$:1,1-DCE molar ratio was the same; the amount of 1,1-DCE dissolved in the liquid phase was estimated to be 50.9 µM (=4.9 ppm) or 254.5 µM, respectively, using a Henry's law constant of 26.1 atm/M and a density of 1.21 g/L. The liquid-phase $H_2$ amount was set approximately 6% in excess to what is needed for complete conversion of 1,1-DCE to ethane ($CH_2=CCl_2 + 3H_2 \rightarrow CH_3CH_3 + 2HCl$). The bottles were placed on a rocking platform to allow dissolution and equilibration of 1,1-DCE between the gas and liquid phases.

Spectra ranging from 100-1700 $cm_{-1}$ Raman shifts were obtained using 0.76 mW of laser power and 10 second integration times, a total acquisition time of one minute per spectrum. Ten spectra were obtained at a single spot prior to the changing of solvents to establish a baseline and ensure the cleanliness of the substrate.

For the chemisorption experiments, the analysis chamber was first flushed with $N_2$-saturated $H_2O$ to remove excess $H_2$ from the cell, and to remove possible chemisorbed $H_2$. The chamber was then flushed with 3 mL of the N2-saturated 1,1-DCE solution (50.9 or 254.5 µM) and spectra were collected over time. Similar experiments were performed using Au NSs (without Pd metal).

Experiments involving a chemisorption-reaction sequence were performed similarly. After flushing with N2-saturated $H_2O$, 3 mL of the 254.5 µM sample was added. Spectra were obtained repeatedly for 30 minutes, after which 1 mL of either 0:100, 25:75, or 30:70 $H_2:N_2$ was quickly flushed through the cell, and spectra were taken continuously until no other changes occurred.

For the reaction experiments, 3 mL of low-concentration (1,1-DCE, 50.9 µM; $H_2$, 16.3 mM) or high concentration (1,1-DCE, 254.5 µM; $H_2$, 81.9 mM) solutions were added, and spectra were collected over time until no noticeable changes in the spectra were observed.

Baseline corrections in the spectra were performed by normalizing to the silicon 520 $cm_{-1}$ mode, to account for any minor drifts in focus over the experimental time frame. The baseline was corrected by subtracting an average of the initial ten spectra taken to determine surface cleanliness.

To analyze the products using the SERS analysis chamber, the same protocol was used as in the SERS reaction experiments, except that aliquots of fluid were removed (~200 µL) at 0, 12, 30, 41, or 100 minutes with a 1-mL needled syringe and injected into a 2-mL septum-capped vial. After allowing the gas and liquid phases of the sample to equilibrate for 30 min, 250 µl of headspace gas was withdrawn with a gas-tight syringe and injected into an Agilent Technologies 6890 GC equipped with a flame ionization detector (FID) and a packed column (6-in×⅛-in outer diameter) containing 60/80 Carbopack B/1% SP-1000 (Supelco). Calibration curves were prepared for chlorinated ethenes, chlorinated ethanes, ethane, and butane. The zero time point samples were verified to match the initial 1,1-DCE concentrations of 50.9 and 254.5 µM for the low and high concentration experiments, respectively.

Upon analysis of the products, it became apparent that, at later time points, the carbon balance did not always close, possibly due to evaporation from the gas-tight syringe before injection into the GC. To correct for this, we assumed evaporation of all components was equal and re-scaled the measured concentrations with the same correction factor, such that the total carbon balance was met for all time points.

The superficial first-order rate constant was determined by linear fitting of $\ln(C/C_0)$ versus time profiles, where C is 1,1-DCE concentration and $C_0$ is the initial 1,1-DCE concentration. Selectivities were calculated by dividing the concentration of each product by the amount of 1,1-DCE reacted.

Example 3

Results

The intensity of the SERS spectrum obtained from pMA-functionalized Au and Pd/Au NSs decreased with the presence of Pd on the NS surface due to damping of the Au NS plasmon resonance (FIG. 2c).

An interesting feature of this SERS spectrum is the shift in the intense, low-frequency peak near 390 $cm_{-1}$ (FIG. 2c, inset). This vibrational mode was assigned to coupling between the metal-sulfur bond stretch and a pMA ring deformation. This peak shifted to 406 $cm_{-1}$ with the addition of Pd, indicating an increase in the surface-pMA bond strength and the possible binding of pMA to Pd surface atoms.

FIG. 2d shows the SERS spectra for 1,1-DCE over Au and Pd/Au NSs. In contrast to the pMA case, it is readily apparent that Pd increased the 1,1-DCE band intensities despite the damping effect of Pd on Au NS extinction.

FIG. 3a-c shows the results of contacting the Pd/Au NSs with an aqueous solution of 1,1-DCE at 50.9 µM. After an induction period, there appeared to be two different time-dependent adsorption states: the initial state (0-20 minutes; FIG. 3b), with Raman spectra featuring bands at 214, 954, ~1060, ~1160, ~1250, 1430, and ~1550 $cm_{-1}$, and the final state (37-52 minutes; FIG. 3c), with bands found at ~225, ~390, ~1165, ~1455, and ~1500 $cm_{-1}$. The peaks can be assigned to wavenumber regions that represent particular Raman-active vibrational modes of surface-bound 1,1-DCE, based on reported assignments for chemisorbed ethylene[34], TCE[35], free 1,1-DCE, and corroborated with ab initio density functional theory calculations. Peaks in the 1500-1600 $cm_{-1}$, 1220-1290 $cm_{-1}$, and 1000-1100 $cm_{-1}$ range were assigned to CC stretching, $CH_2$ scissoring, and $CH_2$ wagging modes of π-bound 1,1-DCE, respectively. The sharp peaks at 954, ~1160, and 1430 $cm_{-1}$ were further assigned to the CC stretching, $CH_2$ wagging, and $CH_2$ scissoring modes of di-σ-bound 1,1-DCE. The other closely located peaks suggest different metal adsorption sites, sites of different binding strengths, or binding states intermediate to those of the π- and di-σ-bound 1,1-DCE species. The low-frequency features below 400 $cm_{-1}$ may be due to C-M (M=metal) or C—Cl bonds. These results provide direct evidence of 1,1-DCE undergoing chemisorption from water.

1,1-DCE adsorption is dynamic, as the initial state changes substantially into a new stable state (FIG. 3a). Signals for π-bound 1,1-DCE were lost, with residual di-σ-bound 1,1-DCE showing the weak peaks at ~1165 and ~1455 $cm_{-1}$. A sharp and intense peak at ~1500 $cm_{-1}$ may be due to the CC stretch of vinylidene (=C=$CH_2$) species; this value is slightly blue-shifted from the theoretical value of 1490 $cm_{-1}$ for vinylidene on Pd(111)[37] and red-shifted from that for vinylidene on Si surfaces[38], and in the range predicted by our ab initio calculations. The bands at 230 $cm_{-1}$ and ~390 $cm_{-1}$ can be attributed to Cl-M and C—M bond stretchings, respectively, consistent with the removal of chlorine from 1,1-DCE to form vinylidene. This process is summarized in Scheme 1.

FIG. 3d-f shows the results of contacting the Pd/Au NSs with an aqueous solution of 1,1-DCE at a higher concentration of 254.5 µM. Unlike the 50.9 µM case, Raman peaks appeared almost immediately after injection of the DCE solution. The peaks at ~220 and, ~400 $cm_{-1}$ (Cl-M and C-M bond stretchings) indicated DCE dechlorination. Bands centered at ~1500 $cm_{-1}$ and ~1200 $cm_{-1}$ were quite broad, spanning at least 100 $cm_{-1}$, suggesting vinylidene and other adsorbed species. The band positions did not change much with time, but their intensities increased continuously until ~20 minutes, after which the spectra stabilized. It is likely that the broad band at ~1500 $cm_{-1}$ represents unsaturated oligomeric species on the metal surface, as they have previously been assigned to conjugated olefins. This is not unexpected, as previous kinetic studies with TCE using Pd-based and Pd/Au-based catalysts have reported trace amounts of carbon-coupling products at low $H_2$/TCE concentration ratios. These olefinic species were observed due to the higher DCE surface concentration, leading to increased interactions between chemisorbed DCE species (i.e., surface crowding effect). These species could be removed from the NS surface by contacting with $H_2$-containing water (Fig. S3) but not with $N_2$-containing water (Fig. S4).

Control experiments using Au-only NSs and 50.9 µM (FIG. 2d) and 254.5 µM DCE (Fig. S5) solutions showed no Raman peaks at all. These results indicated that solvated 1,1-DCE could not be detected at these concentrations and was observable only in the presence of Pd metal, suggesting Pd ensembles or Pd—Au mixed sites as active sites for chemisorption. While the surface structure of Pd on the Au NSs is not known precisely, the metal mostly likely are present as two-dimensional atomic ensembles or islands.

This study shows the successful synthesis and application of Pd-supported Au NSs for the detection of water-phase adsorbates. The Pd metal provided direct binding sites on the Au surface (either as Pd ensembles or Pd—Au mixed sites), effectively lowering the concentration detection limit of 1,1-DCE for SERS to at least 4.9 ppm and extrapoloation of FIG. 2d suggests that detection could easily go as low as 490 ppb (10 times lower).

Significantly, chemical reactions of adsorbate species can be observed as they proceed on the catalyst surface with time, providing a newfound ability to detect and identify reaction intermediates in water under ambient conditions in situ. With further development in improved time and Raman peak resolutions under steady-state flow conditions, NS-enabled SERS may lead to new mechanistic insights into other liquid-phase chemical reactions, like gold-catalyzed glycerol oxidation and platinum catalyzed electroreduction of oxygen, for which spectroscopic analysis is lacking.

Example 4

Other Metals

To date the invention has been exemplified with a gold first layer and palladium second layer. However, nanoshells of other metals have already been successfully used in SERS and other surface enhanced spectroscopic techniques. Thus, silver, copper and first metallic layers can also be used, as these metals have already proven to be useful. Further, any platinum group metal can be used in the second layer as what is required is a catalytically active second metal that can attract and possibly react with the chemical to be detected and this group of metals have proven catalytic activity in a wide range of reactions. Thus, iridium, osmium, palladium, platinum, rhodium, and ruthenium are all expected to be useful in the invention.

To test this hypothesis, cores can be coated with gold silver or copper and each can then be coated with iridium, osmium, palladium, platinum, rhodium, and ruthenium, thus preparing a set of 18 multimetallic nanoshells, each of which can be tested for sensitivity in detecting an appropriate chemical, as described in the prior examples.

REFERENCES

1. A. Tolia, T. Wilke, M. J. Weaver, C. G. Takoudis, *Chemical Engineering Science* 47, 2781 (June-August, 1992).
2. H. Y. H. Chan, C. T. Williams, M. J. Weaver, C. G. Takoudis, *Journal of Catalysis* 174, 191 (Mar. 10, 1998).
3. C. T. Williams, A. A. Tolia, H. Y. H. Chan, C. G. Takoudis, M. J. Weaver, *Journal of Catalysis* 163, 63 (Sep. 15, 1996).
4. T. Wilke, X. P. Gao, C. G. Takoudis, M. J. Weaver, *Journal of Catalysis* 130, 62 (July, 1991).
5. M. F. Mrozek, M. J. Weaver, *Journal of Physical Chemistry B* 105, 8931 (Sep. 20, 2001).
6. C. T. Williams, H. Y. H. Chan, A. A. Tolia, M. J. Weaver, C. G. Takoudis, *Industrial & Engineering Chemistry Research* 37, 2307 (June, 1998).
7. B. R. Z. Q. Tian, D. Y. Wu, *JOURNAL PHYSICAL CHEMISTRY B* 106, 9363 (Sep. 19, 2002, 2002).
8. R. B. Tian Z Q, *Annual Review of Physical Chemistry* 55, 197 (2004).
9. X. Li, D. Heryadi, A. A. Gewirth, *Langmuir* 21, 9251 (Sep. 27, 2005).
10. G. L. Beltramo, T. E. Shubina, M. T. M. Koper, *Chemphyschem* 6, 2597 (Dec. 9, 2005).
11. J. Aizpurua et al., *Physical Review Letters* 90 (Feb. 7, 2003).
12. D. P. Fromm et al., *Journal of Chemical Physics* 124 (Feb. 14, 2006).
13. S. J. Oldenburg, R. D. Averitt, S. L. Westcott, N. J. Halas, *Chemical Physics Letters* 288, 243 (May 22, 1998).
14. C. Fokas, V. Deckert, *Applied Spectroscopy* 56, 192 (February, 2002).
15. R. Gomez, J. Solla-Gullon, J. M. Perez, A. Aldaz, *Journal of Raman Spectroscopy* 36, 613 (June-July, 2005).
16. M. S. Abdelsalam M E, Bartlett P N, Baumberg J J, Russell A E, *Journal of the American Chemical Society* (2007).
17. C. Burato et al., *Advanced Synthesis & Catalysis* 348, 255 (January, 2006).
18. D. I. Enache et al., *Science* 311, 362 (Jan. 20, 2006).
19. M. Bonarowska et al., *Applied Catalysis B*-Environmental 35, 13 (December, 2001).
20. M. Bonarowska, A. Malinowski, W. Juszczyk, Z. Karpinski, *Applied Catalysis B Environmental* 30, 187 (February, 2001).
21. M. O. Nutt, J. B. Hughes, M. S. Wong, *Environmental Science & Technology* 39, 1346 (Mar. 1, 2005).
22. S. Lambert, F. Ferauche, A. Brasseur, J. P. Pirard, B. Heinrichs, *Catalysis Today* 100, 283 (Feb. 28, 2005).
23. M. O. Nutt, K. N. Heck, P. Alvarez, M. S. Wong, *Applied Catalysis Benvironmenta* 69, 115 (2006).
24. US2008204742, US2008096289, US2008096289, U.S. Pat. No. 7,371,457, and related patents or patent applications.

The invention claimed is:

1. A surface active spectroscopy sensor comprising a multimetallic nanoshell having a core and a first layer of coinage metal surrounding said core, and a second layer of platinum group metal at least partially surrounding said first layer and in contact with said first layer, wherein the coinage metal is not the same as the platinum group metal.

2. The surface active spectroscopy sensor of claim 1, wherein said core is silica.

3. The surface active spectroscopy sensor of claim 1, wherein the second layer covers about 5-20% of said first layer.

4. The surface active spectroscopy sensor of claim 1, wherein said first layer covers 80-100% of said core.

5. The surface active spectroscopy sensor of claim 1, wherein the coinage metal is gold, copper, silver, and the platinum group metal is iridium, osmium, palladium, platinum, rhodium, or ruthenium.

6. The surface active spectroscopy sensor of claim 1, wherein the coinage metal is gold and the platinum group metal is palladium.

7. The surface active spectroscopy sensor of claim 1, wherein the core is 5-50 nm, the first layer is <20 nm and the second layer is <1 nm.

8. The surface active spectroscopy sensor of claim 1, wherein the core is 5-50 nm, the first layer is <20 nm gold and the second layer is <1 nm palladium.

9. A multimetallic nanoshell comprising a core, a first layer of coinage metal surrounding said core, and a second layer of platinum group metal at least partially surrounding said first layer and in contact with said first layer, wherein the coinage metal is not the same as the platinum group metal.

10. The multimetallic nanoshell of claim 9, wherein said first layer is 5-20 nm, and said second layer is <1 nm and wherein said second layer covers 5-20% of said first layer.

11. The multimetallic nanoshell of claim 9, wherein said first layer is <5 nm of gold, and said second layer is less than 1 nm of palladium and wherein said second layer covers 5-20% of said first layer.

12. A method of detecting a chemical, the method comprising surface enhanced spectroscopy using a multimetallic nanoshell comprising a core, a first layer of coinage metal surrounding said core, and a second layer of platinum group metal at least partially surrounding said first layer and in contact with said first layer, wherein the coinage metal is not the same as the platinum group metal, and wherein the platinum group metal has affinity for a chemical to be detected and wherein the method detects parts per million of said chemical.

13. The method of claim 12, where the method detects parts per billion of said chemical.

* * * * *